(12) United States Patent
Sahni

(10) Patent No.: US 10,225,004 B2
(45) Date of Patent: *Mar. 5, 2019

(54) METHOD AND SYSTEM FOR CONNECTIONLESS INTEGRATED OPTICAL RECEIVER AND TRANSMITTER TEST

(71) Applicant: Luxtera,, Inc., Carlsbad, CA (US)

(72) Inventor: Subal Sahni, La Jolla, CA (US)

(73) Assignee: Luxtera, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/946,527

(22) Filed: Apr. 5, 2018

(65) Prior Publication Data

US 2018/0227049 A1 Aug. 9, 2018

Related U.S. Application Data

(63) Continuation of application No. 15/401,337, filed on Jan. 9, 2017, now Pat. No. 9,941,957.

(Continued)

(51) Int. Cl.
*G02B 6/30* (2006.01)
*G02B 6/34* (2006.01)
(Continued)

(52) U.S. Cl.
CPC ......... *H04B 10/0731* (2013.01); *H04B 10/07* (2013.01); *H04B 10/40* (2013.01);
(Continued)

(58) Field of Classification Search
None
See application file for complete search history.

(56) References Cited

U.S. PATENT DOCUMENTS

| 5,566,263 A | 10/1996 | Smith |
| 2006/0275038 A1 | 12/2006 | Walton |

(Continued)

OTHER PUBLICATIONS

Backlund et al, Waveguide Input Grating Coupler for Wavelength-Division Multiplexing and Wavelenth Encoding (published in IEEE Photonics Technology Letters, vol. 13 issue: Aug. 8, 2001).

*Primary Examiner* — Casey L Kretzer
(74) *Attorney, Agent, or Firm* — McAndrews, Held & Malloy

(57) ABSTRACT

Methods and systems for a connectionless integrated optical receiver and transmitter test are disclosed and may include an optoelectronic transceiver comprising a transmit (Tx) path and a receive (Rx) path, with each path comprising optical switches. The transceiver may be operable to: generate a first modulated optical signal utilizing a modulator in the Tx path, couple the first modulated optical signal to a first optical switch in the Rx path via a second optical switch in the Tx path when the optoelectronic transceiver is configured in a self-test mode, receive a second modulated optical signal via a grating coupler in the Rx path when the optoelectronics transceiver is configured in an operational mode, and communicate the second modulated optical signal to a photodetector in the Rx path via the first optical switch. The first modulated optical signal may be communicated to a grating coupler in the Tx path via the second optical switch.

20 Claims, 11 Drawing Sheets

Related U.S. Application Data

(60) Provisional application No. 62/387,837, filed on Jan. 7, 2016, provisional application No. 62/403,447, filed on Oct. 3, 2016.

(51) Int. Cl.
*G02B 6/42* (2006.01)
*H04B 10/07* (2013.01)
*H04B 10/40* (2013.01)
*H04B 10/80* (2013.01)
*H04B 10/073* (2013.01)

(52) U.S. Cl.
CPC ............ *H04B 10/801* (2013.01); *G02B 6/30* (2013.01); *G02B 6/34* (2013.01); *G02B 6/4246* (2013.01)

(56) References Cited

U.S. PATENT DOCUMENTS

| | | | |
|---|---|---|---|
| 2007/0253659 A1* | 11/2007 | Toyoda | G02B 6/12011 385/3 |
| 2012/0170938 A1 | 7/2012 | Evans | |
| 2012/0251041 A1 | 10/2012 | Ishikawa | |
| 2014/0029943 A1 | 1/2014 | Mathai et al. | |
| 2014/0043050 A1* | 2/2014 | Stone | H04B 10/0731 324/750.01 |
| 2014/0341595 A1 | 11/2014 | Harley | |
| 2014/0369693 A1* | 12/2014 | Peterson | H01L 21/84 398/138 |

* cited by examiner

METHOD AND SYSTEM FOR CONNECTIONLESS INTEGRATED OPTICAL RECEIVER AND TRANSMITTER TEST

CROSS-REFERENCE TO RELATED APPLICATIONS/INCORPORATION BY REFERENCE

This application is a continuation of U.S. application Ser. No. 15/401,337 filed on Jan. 9, 2017, which claims priority to and the benefit of U.S. Provisional Application No. 62/387,837 filed on Jan. 7, 2016, and U.S. Provisional Application 62/403,447 filed on Oct. 3, 2016, each of which is hereby incorporated herein by reference in its entirety.

FIELD

Certain embodiments of the disclosure relate to semiconductor photonics. More specifically, certain embodiments of the disclosure relate to a method and system for connectionless integrated optical receiver and transmitter test.

BACKGROUND

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present disclosure as set forth in the remainder of the present application with reference to the drawings.

BRIEF SUMMARY

A system and/or method for a connectionless integrated optical receiver and transmitter test, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

Certain aspects of the disclosure may be found in a method and system for a connectionless integrated optical receiver and transmitter test. Exemplary aspects of the disclosure may comprise an optoelectronic transceiver comprising a transmit (Tx) path and a receive (Rx) path, with each path comprising one or more optical switches. The transceiver may be operable to: generate a first modulated optical signal utilizing a modulator in the Tx path, couple the first modulated optical signal to a first optical switch in the Rx path via a second optical switch in the Tx path when the optoelectronic transceiver is configured in a self-test mode, receive a second modulated optical signal via a grating coupler in the Rx path when the optoelectronics transceiver is configured in an operational mode, and communicate the second modulated optical signal to a photodetector in the Rx path via the first optical switch. The first modulated optical signal may be communicated to a grating coupler in the Tx path via the second optical switch. The one or more optical switches in the Rx and Tx paths may be normally off optical switches. The one or more optical switches in the Rx and Tx paths may include first and second directional couplers and at least one phase modulator. The one or more optical switches may be configured in different states by applying bias to the at least one phase modulator. The first modulated optical signal may be communicated from the second optical switch in the Tx path to the first optical switch in the Rx path via a directional coupler between the Tx path and the Rx path. The first modulated optical signal may be communicated from the second optical switch in the Tx path to the first optical switch in the Rx path via a third optical switch in the Tx path. The first modulated signal may be communicated to the grating coupler in the Rx path via the first optical switch and a fourth optical switch in the Rx path when the optoelectronic transceiver is configured in the self-test mode. The first optical switch may be coupled to a first input of the photodetector and the fourth optical switch may be coupled to a second input of the photodetector. The optoelectronic transceiver may be on a semiconductor die.

Figure 1A:
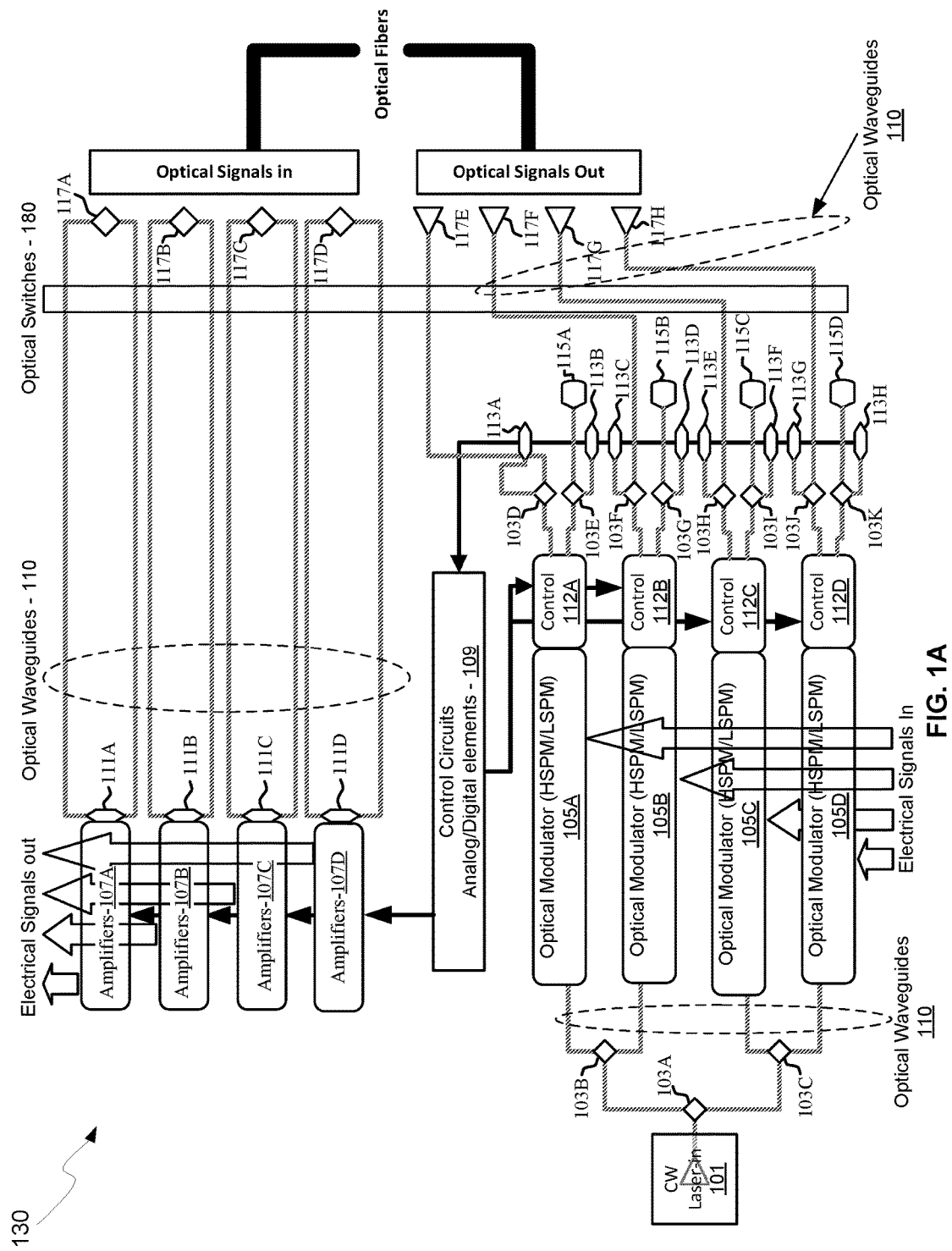
FIG. 1A is a block diagram of a photonically-enabled integrated circuit with a distributed optoelectronic receiver, in accordance with an example embodiment of the disclosure.

FIG. 1A is a block diagram of a photonically-enabled integrated circuit with a distributed optoelectronic receiver, in accordance with an example embodiment of the disclosure. Referring to FIG. 1A, there are shown optoelectronic devices on a photonically-enabled integrated circuit 130 comprising optical modulators 105A-105D, photodiodes 111A-111D, monitor photodiodes 113A-113H, and optical devices comprising couplers 103A-103K, optical terminations 115A-115D, and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

In an example scenario, the photonically-enabled integrated circuit 130 comprises a CMOS photonics die with a laser assembly 101 coupled to the top surface of the IC 130. The laser assembly 101 may comprise one or more semiconductor lasers with isolators, lenses, and/or rotators for directing one or more CW optical signals to the coupler 103A.

Optical signals are communicated between optical and optoelectronic devices via optical waveguides 110 fabricated in the photonically-enabled integrated circuit 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, for example transverse-electric (TE) and transverse-magnetic (TM), or for waveguides that are truly single mode and only support one mode whose polarization is, for example, TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab. Of course, other waveguide cross section types are also contemplated and within the scope of the disclosure.

In an example scenario, the couplers 103A-103C may comprise low-loss Y-junction power splitters where coupler 103A receives an optical signal from the laser assembly 101 and splits the signal to two branches that direct the optical signals to the couplers 103B and 103C, which split the optical signal once more, resulting in four roughly equal power optical signals.

The optical modulators 105A-105D comprise Mach-Zehnder or ring modulators, for example, and enable the modulation of the continuous-wave (CW) laser input signal. The optical modulators 105A-105D may comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

The outputs of the optical modulators 105A-105D may be optically coupled via the waveguides 110 to the grating couplers 117E-117H. The couplers 103D-103K may comprise four-port optical couplers, for example, and may be utilized to sample or split the optical signals generated by the optical modulators 105A-105D, with the sampled signals being measured by the monitor photodiodes 113A-113H. The unused branches of the directional couplers 103D-103K may be terminated by optical terminations 115A-115D to avoid back reflections of unwanted signals.

The grating couplers 117A-117H comprise optical gratings that enable coupling of light into and out of the photonically-enabled integrated circuit 130. The grating couplers 117A-117D may be utilized to couple light received from optical fibers into the photonically-enabled integrated circuit 130, and the grating couplers 117E-117H may be utilized to couple light from the photonically-enabled integrated circuit 130 into optical fibers. The grating couplers 117A-117H may comprise single polarization grating couplers (SPGC) and/or polarization splitting grating couplers (PSGC). In instances where a PSGC is utilized, two input, or output, waveguides may be utilized.

The optical fibers may be epoxied, for example, to the CMOS chip, and may be aligned at an angle from normal to the surface of the photonically-enabled integrated circuit 130 to optimize coupling efficiency. In an example embodiment, the optical fibers may comprise single-mode fiber (SMF) and/or polarization-maintaining fiber (PMF).

Figure 1B:
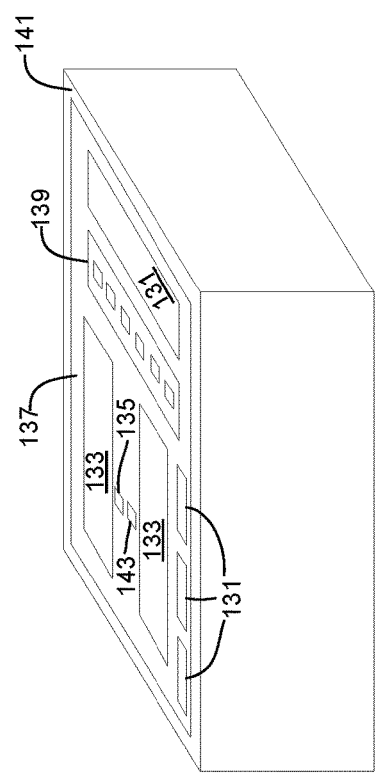
FIG. 1B is a diagram illustrating an exemplary photonically-enabled integrated circuit, in accordance with an exemplary embodiment of the disclosure.
Figure 1B:
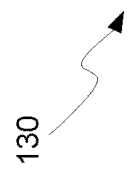

In another exemplary embodiment illustrated in FIG. 1B, optical signals may be communicated directly into the surface of the photonically-enabled integrated circuit 130 without optical fibers by directing a light source on an optical coupling device in the chip, such as the light source interface 135 and/or the optical fiber interface 139. This may be accomplished with directed laser sources and/or optical sources on another chip flip-chip bonded to the photonically-enabled integrated circuit 130.

The photodiodes 111A-111D may convert optical signals received from the grating couplers 117A-117D into electrical signals that are communicated to the amplifiers 107A-107D for processing. In another exemplary embodiment of the disclosure, the photodiodes 111A-111D may comprise high-speed heterojunction phototransistors, for example, and may comprise germanium (Ge) in the collector and base regions for absorption in the 1.3-1.6 μm optical wavelength range, and may be integrated on a CMOS silicon-on-insulator (SOI) wafer. In an example scenario, each of the photodiodes 111A-111D may comprise a pair of photodiodes with splitters at the inputs so that each receives the optical signals from the optical waveguides 110 from a single PSGC 117A-117D.

The analog and digital control circuits 109 may control gain levels or other parameters in the operation of the amplifiers 107A-107D, which may then communicate electrical signals off the photonically-enabled integrated circuit 130. The control sections 112A-112D comprise electronic circuitry that enable modulation of the CW laser signal received from the splitters 103A-103C. The optical modulators 105A-105D may require high-speed electrical signals to modulate the refractive index in respective branches of a Mach-Zehnder interferometer (MZI), for example. The amplifiers 107A-107D may comprise parallel receiver paths with separate photodiodes and TIAs, with each path tuned to a different frequency range such that one may receive and amplify low frequencies and the other for high frequencies, and with the electrical outputs combined to result in a desired wide frequency response. Conventional optoelectronic receivers are configured for low and high frequency ranges. Optimizing each path of the receiver around a specific portion of the frequency spectrum may result in improved receiver sensitivity and improved frequency response (even down to DC). Such a structure may be used as an optical continuous time linear equalizer or an optical frequency discriminator, for example.

In operation, the photonically-enabled integrated circuit 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, with parallel high and low frequency paths that are summed electrically, and subsequently communicated to other electronic circuitry, not shown, in the photonically-enabled integrated circuit 130.

Integrated photonics platforms allow the full functionality of an optical transceiver to be integrated on a single chip. An optical transceiver chip contains optoelectronic circuits that create and process the optical/electrical signals on the transmitter (Tx) and the receiver (Rx) sides, as well as optical interfaces that couple the optical signals to and from a fiber. The signal processing functionality may include modulating the optical carrier, detecting the optical signal, splitting or combining data streams, and multiplexing or demultiplexing data on carriers with different wavelengths, and equalizing signals for reducing and/or eliminating inter-symbol interference (ISI), which may be a common impairment in optical communication systems.

Designing built-in self-test blocks for the receiver side of optical pluggable modules is particularly difficult since an external optical source is needed for the measurements. The schemes described in the present disclosure use the transmitter output of the module itself to test the receivers without adversely impacting the actual data path. The embodiments allow testing the entire receiver path: from the loss of the receiver fiber interface element all the way through to the performance of the high-speed photodetector and transimpedance amplifier chain.

Example implementations of internal optical loopback to the actual receiver photodetectors 111A-111D are presented below. This greatly improves receiver test coverage by exercising the full optical path and all the high speed electrical blocks in the actual data path. This also eliminates dummy photodiodes, TIAs, limiting amplifiers, and other Rx path circuitry from all receiver lanes. The implementation(s) utilize a "Normally OFF" optical switch, which is a low speed optoelectronic device that has very high passive optical insertion loss, which can be eliminated by applying electrical bias. The switches are shown schematically in FIG. 1A as the optical switches 180 that may be operable to loop back Tx optical signals to the Rx path when activated and let signals pass through normally when not activated. This is shown further with respect to FIGS. 2-8 for example. This loopback technique therefore does not require a high speed photodiode design. In an example scenario, the dual inputs of the Normally OFF switch are used, and leverage the fact that the switch to internal loopback can occur at the expense of an external input signal into the receiver.

To assess the optical performance in a conventional QSFP module (insertion loss vs expectations, for example), a physical connection is made to the optical connector. Unfortunately, connection variability has an impact on test gauge and also increases the need for cleaning and inspection of connectors, which is a cost adder to the production line. The transmitters in most modules can be tested pretty effectively by turning on the laser(s) in the module and using a Large Area Detector (LAD) to measure the output power, but testing the receivers is an issue.

A scheme to test the receivers without making an optical connection to the receiver is described in this disclosure, where both transmitters and receivers may be tested with the Tx and Rx circuitry and a large area detector without the need for a physical optical connection to the receiver, where the implementations are based on a Normally OFF optical switch design.

FIG. 1B is a diagram illustrating an exemplary photonically-enabled integrated circuit, in accordance with an exemplary embodiment of the disclosure. Referring to FIG. 1B, there is shown the photonically-enabled integrated circuit 130 comprising electronic devices/circuits 131, optical and optoelectronic devices 133, a light source interface 135, a chip front surface 137, an optical fiber interface 139, CMOS guard ring 141, and a surface-illuminated monitor photodiode 143.

The light source interface 135 and the optical fiber interface 139 comprise grating couplers, for example, that enable coupling of light signals via the CMOS chip surface 137, as opposed to the edges of the chip as with conventional edge-emitting/receiving devices. Coupling light signals via the chip surface 137 enables the use of the CMOS guard ring 141 which protects the chip mechanically and prevents the entry of contaminants via the chip edge.

The electronic devices/circuits 131 comprise circuitry such as the amplifiers 107 and the analog and digital control circuits 109 described with respect to FIG. 1A, for example. The optical and optoelectronic devices 133 comprise devices such as the couplers 103A-103K, optical couplers 104, optical terminations 115A-115D, grating couplers 117A-117H, optical modulators 105A-105D, high-speed heterojunction photodiodes 111A-111D, and monitor photodiodes 113A-113H.

In an example embodiment, the optical fiber cable may be affixed, via epoxy for example, to the CMOS chip surface 137. The fiber chip coupler 145 enables the physical coupling of the optical fiber cable 149 to the photonically-enabled integrated circuit 130. In another example scenario, the IC 130 may comprise photonic devices on one die, such as a photonics interposer, and electrical devices on an electronics die, both of which may comprise CMOS die.

The coupling of the fiber-to-chip coupler 145 and the optical source assembly 147 may be enabled with a gripper in a pick-and-place tool that comprises two or more optical fibers that are coupled to couplers in the optical chip 135 such that the optical circuitry and/or the optical sources may be tested in an active alignment procedure, while not requiring the powering up of the chip 135.

Figure 1C:
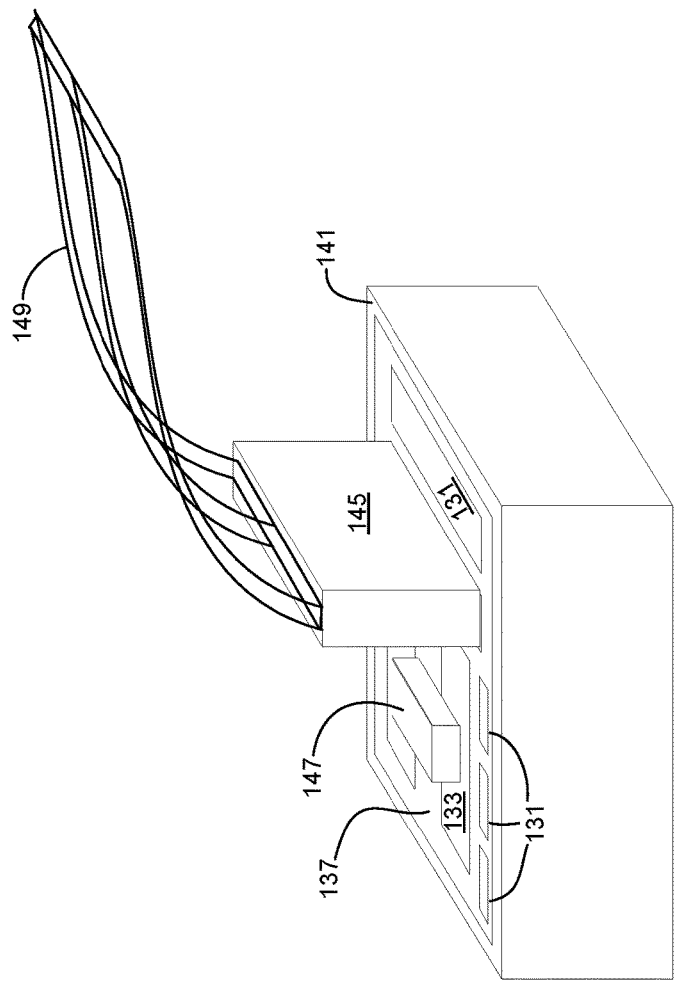
FIG. 1C is a diagram illustrating a photonically-enabled integrated circuit coupled to an optical fiber cable, in accordance with an example embodiment of the disclosure.

While a single die is shown in FIGS. 1A-1C, the chip 135 may instead comprise a plurality of die. In an example scenario, one or more electronic die may be coupled to a photonics die, i.e., a photonic interposer, comprising optical and optoelectronic devices for communicating optical signals between electronics die, for example.

FIG. 1C illustrates the transceiver after completing fabrication, where fibers are coupled to the Rx side of the transceiver. However, it is often desirable to test the transceiver circuitry before making physical connection to the die, which is described by way of example with respect to FIGS. 2-9.

Figures 2A, 2B:
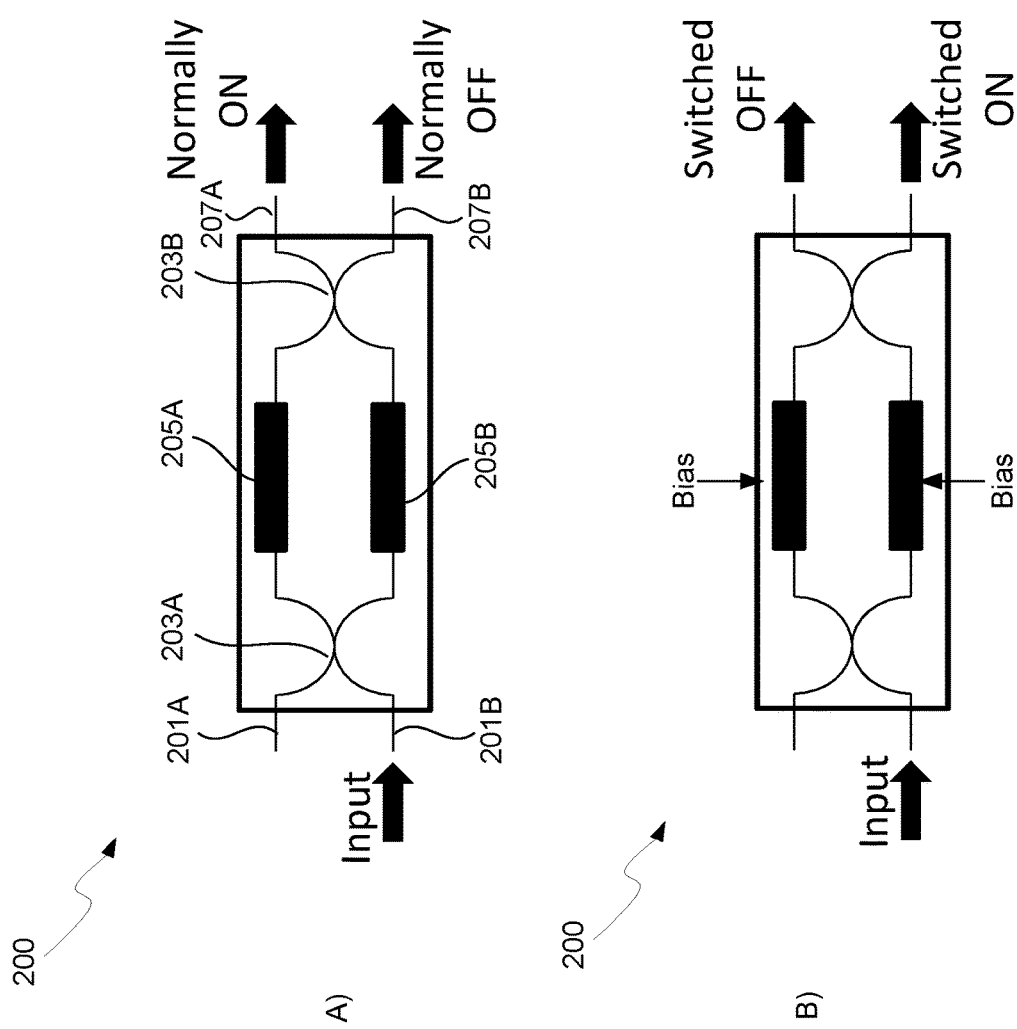
FIGS. 2A and 2B illustrate operational states of a multi-input normally off optical switch, in accordance with an example embodiment of the disclosure.

FIGS. 2A and 2B illustrate two states of a multi-port normally-off optical switch, in accordance with an example embodiment of the disclosure. Referring to FIG. 2A, there is shown optical switch 200 comprising input waveguides 201A and 201B, waveguide 201B being an input port of optical switch 200, a first directional coupler 203A, a pair of phase modulators 205A and 205B, a second directional coupler 203B, and two output ports 207A and 207B.

The phase modulators 205A and 205B may comprise low speed phase modulators, such as thermal modulators or PIN diodes. In an example scenario, the first and second directional couplers 203A and 203B may be 50% directional couplers, enabling a nominal 0% or 100% optical signal out of each output waveguide 207A and 207B during operation. In an example scenario, for one arm of the switch to be driven to ~180 degrees of phase shift, around 1 mA of drive current for a 250 µm long PIN phase modulator section may be sufficient.

The optical switch 200 may operate in a "Normally OFF" or passive output state as shown in FIG. 2A, which enables built-in self-test capabilities in a photonic circuit comprising a transceiver on the same chip, such that an optical connection to the surface of the chip comprising the photonic circuit is not necessary for such testing. A "Normally ON" port, with its corresponding input port, Input, may be connected to the actual system data path in the receiver, with the Normally OFF port coupled to a built-in self-test path. Since the system path is normally on, during regular operation of the transceiver, no active control signal needs to be sent to the optical switch 200, thereby saving unnecessary power dissipation and reducing the chance of the built-in self-test feature interfering with normal system operation.

FIG. 2A illustrates the optical switch 200 in a passive state, where no bias is applied to the phase modulators 205A and 205B, and a signal coupled to Input port of the optical switch 200 is coupled to the Normally ON output. The optical switch 200 may be turned on to enable a test mode by applying a bias to the low speed phase modulators 205A and 205B, as shown in FIG. 2B. In this state, an input optical signal coupled to Input is then coupled to the "Switched ON" output, which is the Normally OFF output port.

Although FIGS. 2A and 2B illustrate a phase modulator for each arm of the switch for symmetry, single-ended current drive is also possible, where only one of the phase modulators 205A and 205B receives a bias signal to change the state of the optical switch 200. In an example embodiment, to achieve the best performance in terms of extinction ratio and insertion loss, the waveguides between the two directional couplers 203A and 203B are as short as possible, meaning the low speed phase modulators 205A and 205B result in higher performance.

Figure 3:
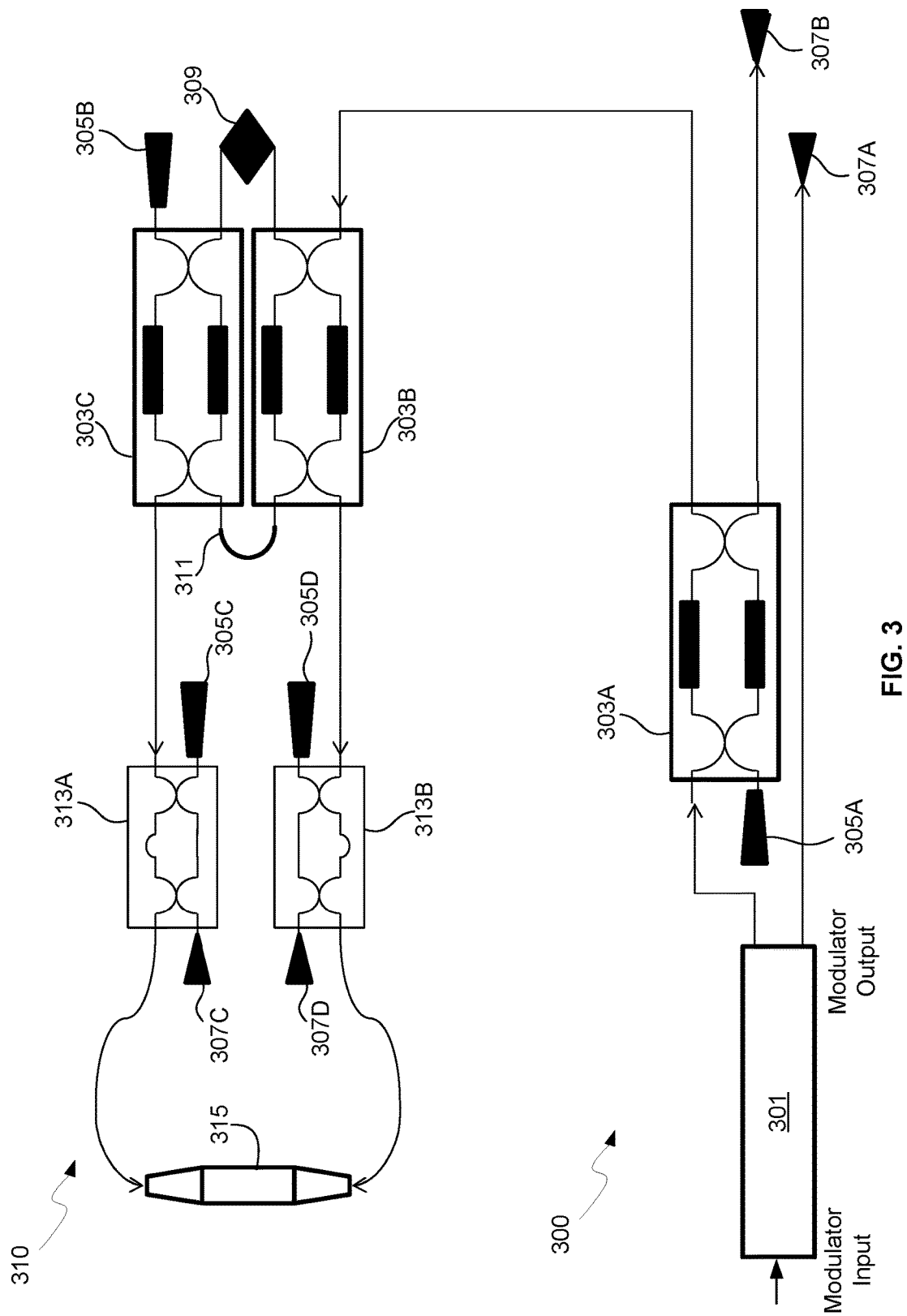
FIG. 3. Illustrates a transmitter and receiver with built-in self-test capabilities, in accordance with an example embodiment of the disclosure.

FIG. 3. Illustrates a transmitter and receiver with built-in self-test capabilities, in accordance with an example embodiment of the disclosure. Referring to FIG. 3, there is shown a transmitter path 300 and a receiver path 310 with optical switches 303A-303C for providing built-in self-test capabilities. The transmitter path 300 in this simplified view comprises a modulator 301, an optical switch 303A, and transmitter output grating couplers 307A and 307B.

The modulator 301 may comprise a Mach-Zehnder Interferometer (MZI), for example, that may be operable to receive a continuous-wave optical signal and one or more electrical signals for modulating the optical signal, thereby generating a modulated optical signal. The outputs of the modulator 301 may be coupled via optical waveguides to the grating coupler 307A and to the Normally OFF optical switch 303A.

The optical switches 303A-303C may be substantially similar to the optical switch 200 described with respect to FIG. 2A comprising Normally OFF optical switches in this example. One of the inputs to the optical switch 303A may be coupled to an optical termination 305A to prevent optical signals from being communicated from this terminal. In the passive, or OFF state, the optical switch may couple the input signal received from the modulator 301 to the grating coupler 307A, and in the ON state, may couple the received optical signal to the optical switch 303B in the receiver path 310.

The receiver path 310 comprises an input polarization splitting grating coupler (PSGC) 309 coupled to the optical switches 303B and 303C, directional couplers 313A and 313B, and a high speed photodetector 315. The directional couplers 313A and 313B may comprise 1% tap directional couplers where one output of each is coupled to a different inputs of the photodetector 315 and the other output of each is coupled to grating couplers 307C and 307D, thereby providing a sample output of the receiver path 310 prior to the photodetector 315.

In normal operation mode, with the optical switches 303A, 303B, and 303C switched off, the optical signals generated in the transmitter path 300 may be communicated out of the Tx grating couplers 307A and 307B, while signals received by the receiver PSGC 309 may be passed through the optical switches 303B and 303C and communicated to the photodetector 315 via the directional couplers 313A and 313B. This mode is illustrated by way of example in FIG. 4.

Figure 4:
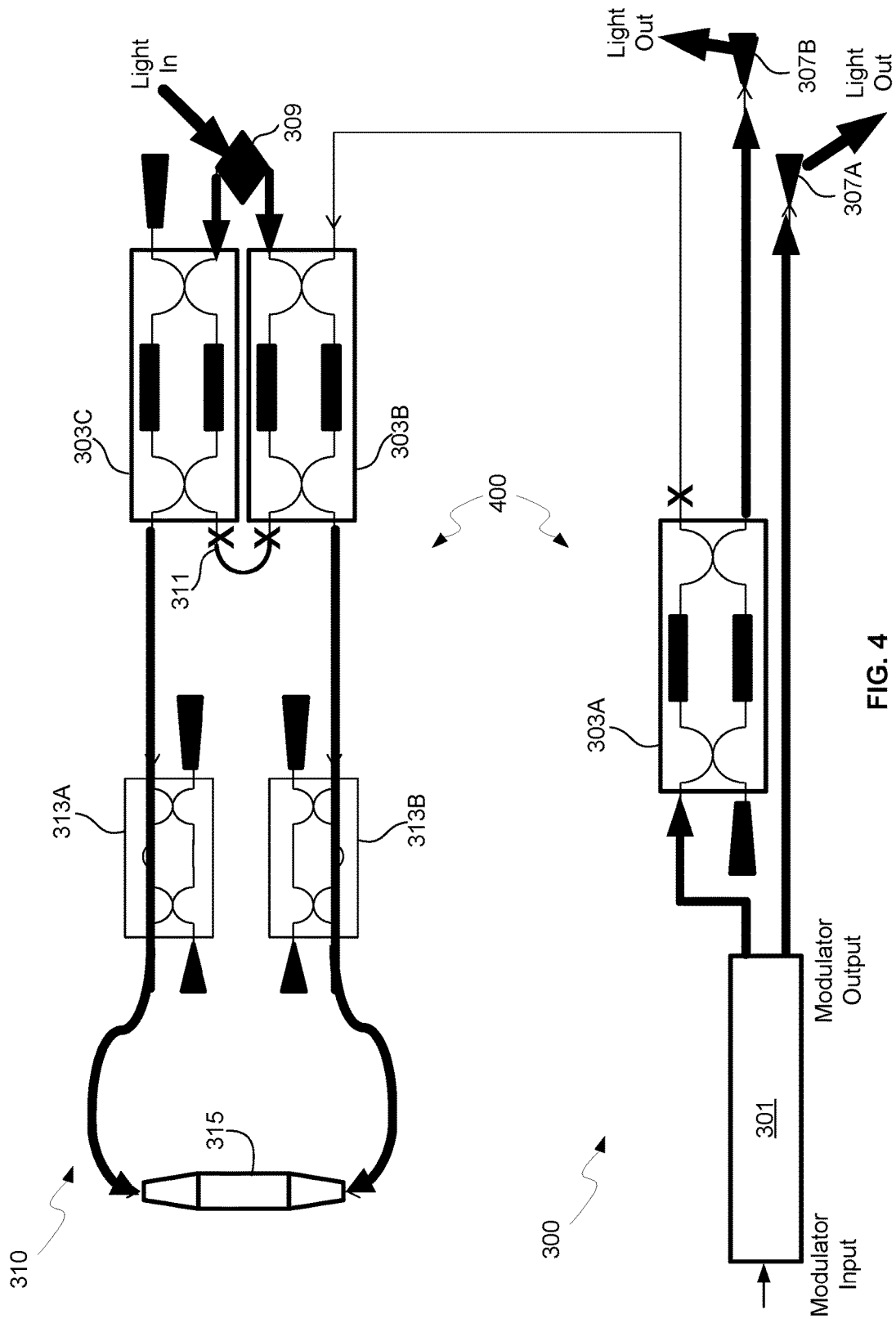
FIG. 4 illustrates a passive state for an integrated transceiver with built-in self-test capabilities, in accordance with an example embodiment of the disclosure.

FIG. 4 illustrates a passive state for an integrated transceiver with built-in self-test capabilities, in accordance with an example embodiment of the disclosure. Referring to FIG. 4, there is shown transceiver 400 comprising the Tx path 300 and the Rx path 310. In this passive state, where an optical signal at the modulator 301 input may be utilized to generate an optical signal that may be communicated from one output of the MZI passing through the Normally OFF optical switch 303A to output coupler 307B, while the other output of the MZI 301 is coupled to output coupler 307A.

The optical paths with light being communicated through them are indicated by the wide black arrows in FIGS. 4-9. The "Light Out" arrows on the grating couplers 307A and 307B merely indicate that light is communicated out of the surface of the grating couplers and are in different directions merely for clarity of illustration, as they may couple signals in the same or different directions, depending on the layout of the grating couplers 307A and 307B. The "X" at the other output of the optical switch 303A indicates that no optical signal passes through, or at most a highly attenuated signal is communicated at this output.

In the Rx path 310, a Light In signal received by the PSGC 309 is coupled into two outputs of the PSGC that are coupled to the Normally OFF optical switches 303B and 303C, which in this mode are under no bias, such that they couple the received signal to the photodetector 315, passing through the 1% tap directional couplers 313A and 313B. The cavity 311 coupling two outputs of the Normally OFF optical switches 303B and 303C may provide a direct feedback path for the signals entering the PSGC 309. But the total loss in the feedback path will be of the order of 30-40 dB, which should not cause any issues in performance. This is indicated by the "X"s at the normally OFF outputs of the optical switches 303B and 303C.

In this passive state, the transceiver 400 may be in a "normal" operational state and not in internal test mode, where the Tx path 300 is communicating signals out of the output couplers 307A and 307B, and the Rx path 310 is receiving optical signals via the Rx PSGC 309 and coupling them to the photodetector 310, with little or no signal being coupled through the normally off outputs of the optical switches 303B and 303C.

Figure 5:
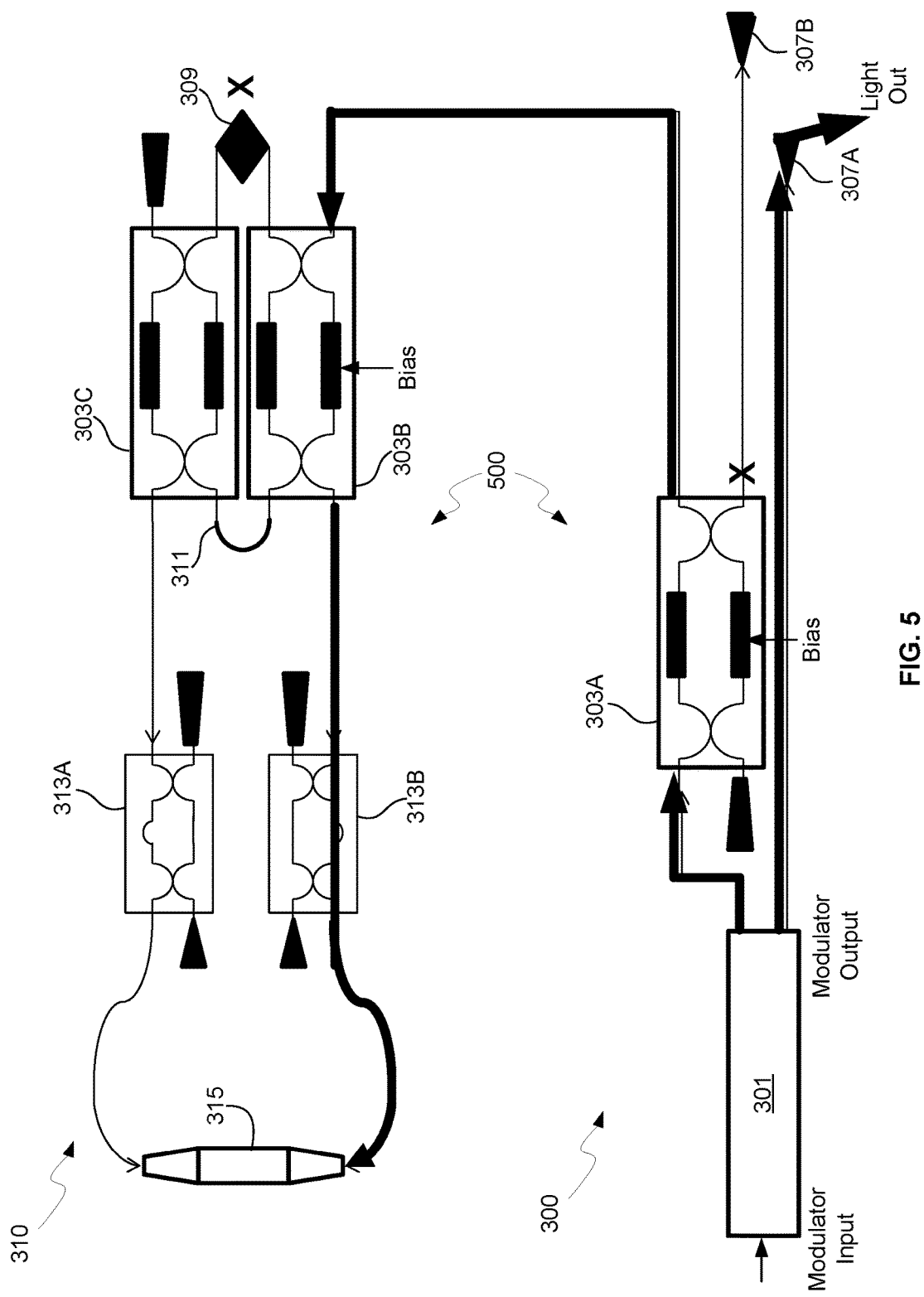
FIG. 5 illustrates a first test mode for an integrated transceiver with built-in self-test capabilities, in accordance with an example embodiment of the disclosure.

FIG. 5 illustrates a first test mode for an integrated transceiver with built-in self-test capabilities, in accordance with an example embodiment of the disclosure. Referring to FIG. 5, there is shown transceiver 500 in internal test mode with the Tx path 300 having an optical signal from one output of the MZI passing through the Normally OFF optical switch 303A that is now in an ON state such that the input optical signal is now coupled to optical switch 303B in the receiver path 310 and the other output of the MZI is still directly coupled to output coupler 307A. The optical switch 303B in the Rx path 310 that receives the optical signal from the Tx path 300 is also in an on state, indicated by the bias signal, such that the optical signal received from the Tx path 300 is coupled to the photodetector 315 instead of a signal from the PSGC 309 being coupled to the photodetector 315. In this way, both the Tx path 300 and the Rx path can be tested internally.

The optical switch 303C in the Rx path 310 may remain in an OFF state, with no bias applied and with no coupling of any optical signals to either port as there is no nominal signal applied to this switch.

The cavity 311 coupling an output of each of the Rx optical switches 303B and 303C does couple signals between the two switches, but since the optical switch 303B receiving the loop back signal from the Tx path 300 is in an ON state, no optical signal is coupled to the other output of switch 303B that is coupled to the cavity 311, and thus no signals are coupled to optical switch 303C.

This mode enables testing of the Tx path 300 as well as most of the Rx path 310 other than the section from the PSGC 309 to the optical switches 303B and 303C. Therefore, the transceiver 500 may be tested without making a physical connection, such as the fiber coupling of FIG. 1C.

Figure 6:
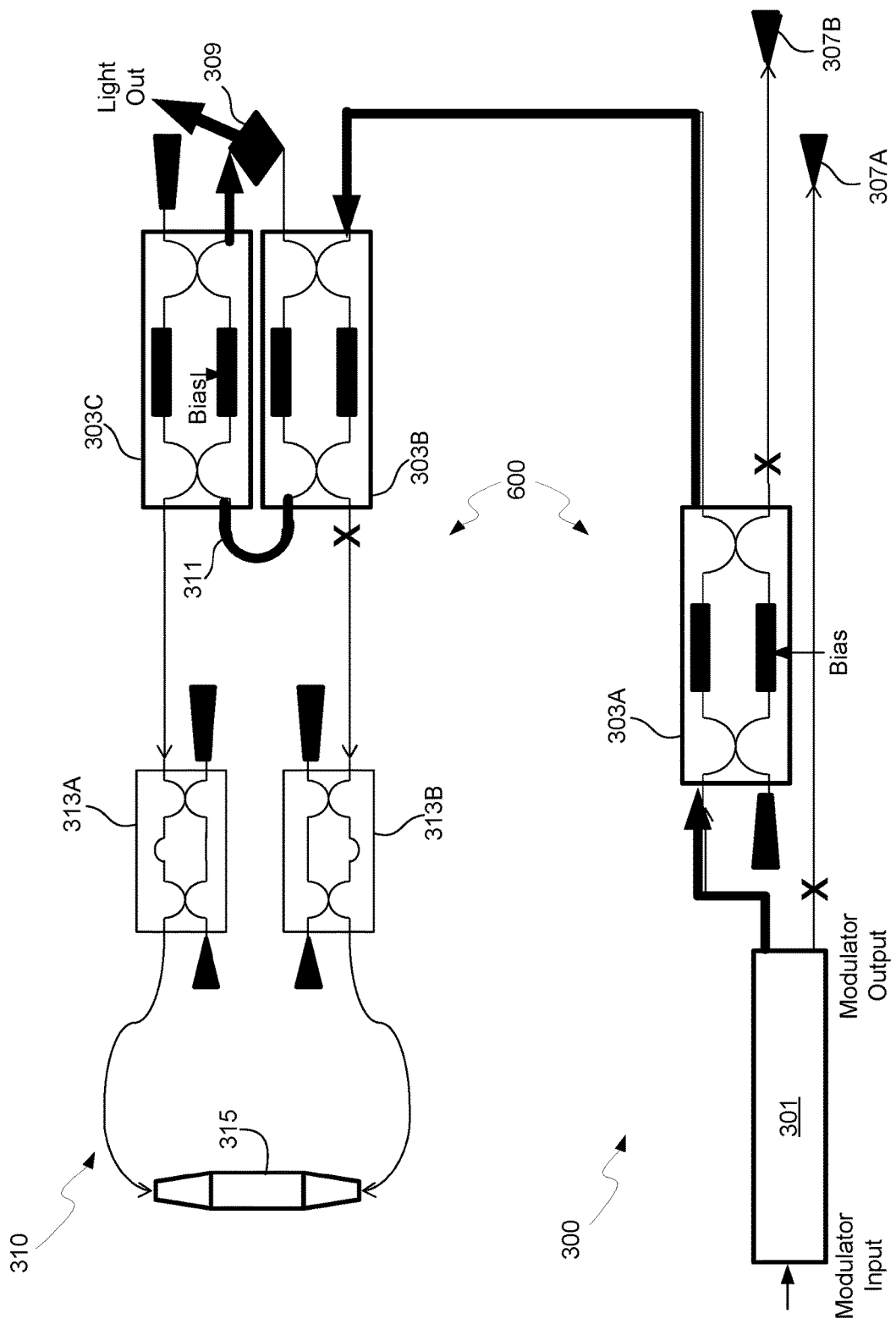
FIG. 6 illustrates a second test mode for an integrated transceiver with built-in self-test capabilities, in accordance with an example embodiment of the disclosure.

FIG. 6 illustrates a second test mode for an integrated transceiver with built-in self-test capabilities, in accordance with an example embodiment of the disclosure. Referring to FIG. 6, there is shown transceiver 600 with Tx path 300 and Rx path 310, where the modulator 301 is set to transmit at a minimal level via the output coupled to the grating coupler 307A, while communicating a desired level out of the other output coupled to the optical switch 303A.

In the mode shown in FIG. 6, the Normally OFF optical switch 303A is configured in an ON state such that the input optical signal is now coupled to the Normally OFF optical switch 303B in the receiver path 310. The Normally OFF optical switch 303B is in its normally OFF state while the other Normally OFF optical switch 303C is now in an ON state such that the received optical signal is coupled to the cavity 311 so that it loops back to the PSGC 309, via the optical switch 303C, where it may be received by a large area detector through a low-profile coupler, for example. The upper right input of the upper optical switch 303C, not coupled to the PSGC 309, does not receive any input signal to avoid coupling a signal back to the modulator 301 via the cavity 311 and optical switch 303B. Instead, this input is coupled to an optical termination, as is done for the unused inputs/outputs of the directional couplers 313A and 313B. In this way, the output path from the PSGC 309 through the fiber coupling element can be tested. Combined with the method described above this provides test coverage of the entire Rx path without making an external connection.

Figure 7:
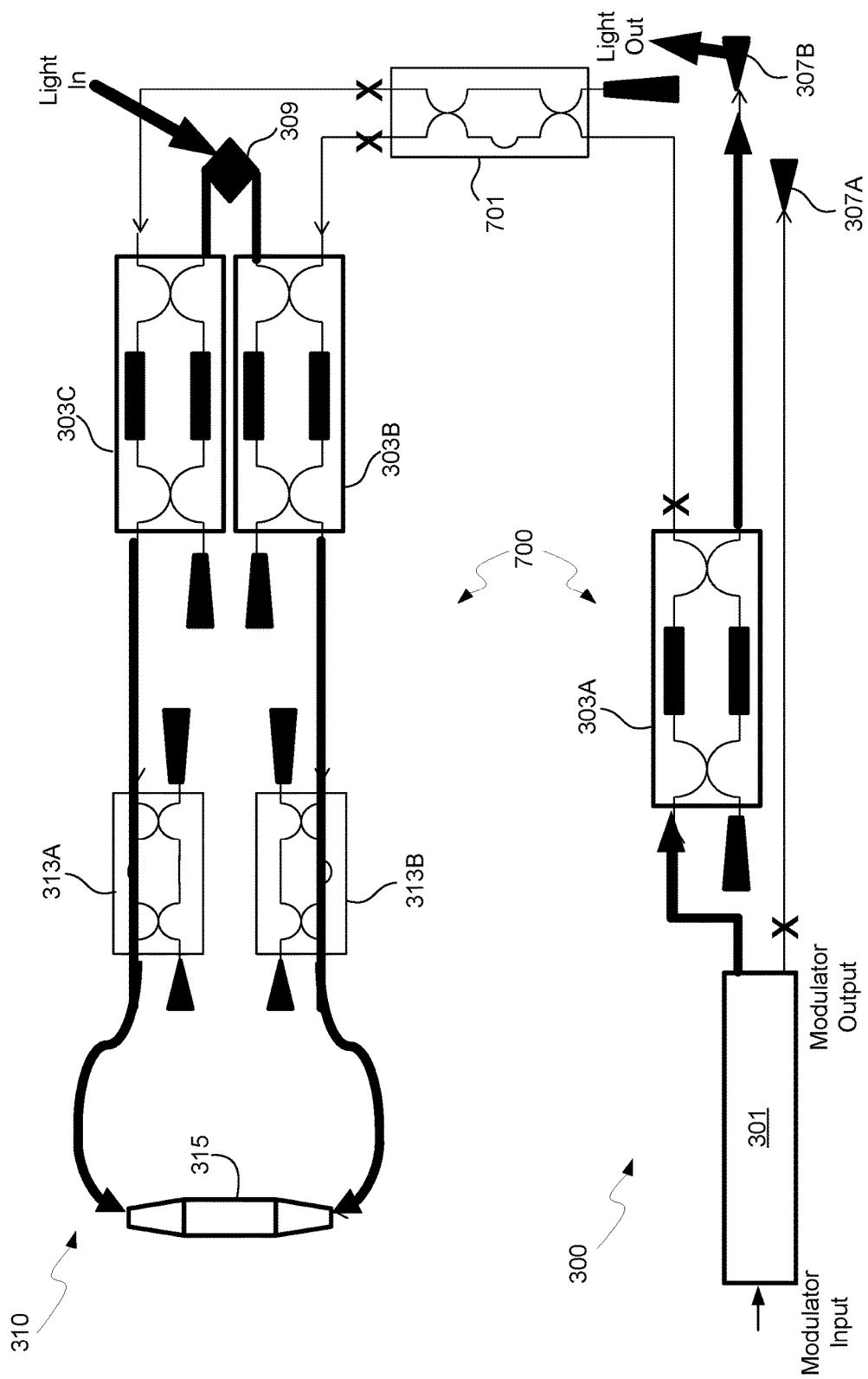
FIG. 7 illustrates another example integrated transceiver with built-in self-test capabilities, in accordance with an example embodiment of the disclosure.

FIG. 7 illustrates another example integrated transceiver with built-in self-test capabilities, in accordance with an example embodiment of the disclosure. Referring to FIG. 7, there is shown transceiver 700 comprising Tx path 300 and Rx path 310 with similar structure to the previous transceivers, but with a directional coupler 701 providing the loopback path from Tx path 300 to Rx path 310 and no cavity between the Tx path 310 optical switches 303B and 303C. The directional coupler 701 may comprise a 50% tap directional coupler, such that essentially equal magnitude optical signals are communicated to the optical switches 303B and 303C.

The Tx path 300 comprises a modulator 301 and Normally OFF optical switch 303A, while the Rx path 310 comprises PSGC 309, Normally OFF optical switches 303B and 303C, directional couplers 313A and 313B, and high speed photodetector 315. Since there is no cavity coupling outputs of the two optical switches 303B and 303C in the Rx path 310, optical terminations are placed at these outputs.

In instances where the optical switch 303A is OFF, the bar output of the modulator 301 is coupled to the grating coupler 307B, and when the Normally OFF switches in the Rx path are also in an OFF state, optical signals received by the Rx PSGC 309 are coupled to the photodetector 315. This represents a "normal" operational mode of the transceiver comprising the Tx and Rx paths where the Tx path 300 is transmitting modulated optical signals out of the chip and the Rx path 310 is receiving modulated optical signals from off the chip. The optical switches may each provide 15-20 dB OFF port suppression, resulting in 30-40 dB total loopback crosstalk suppression.

Figure 8:
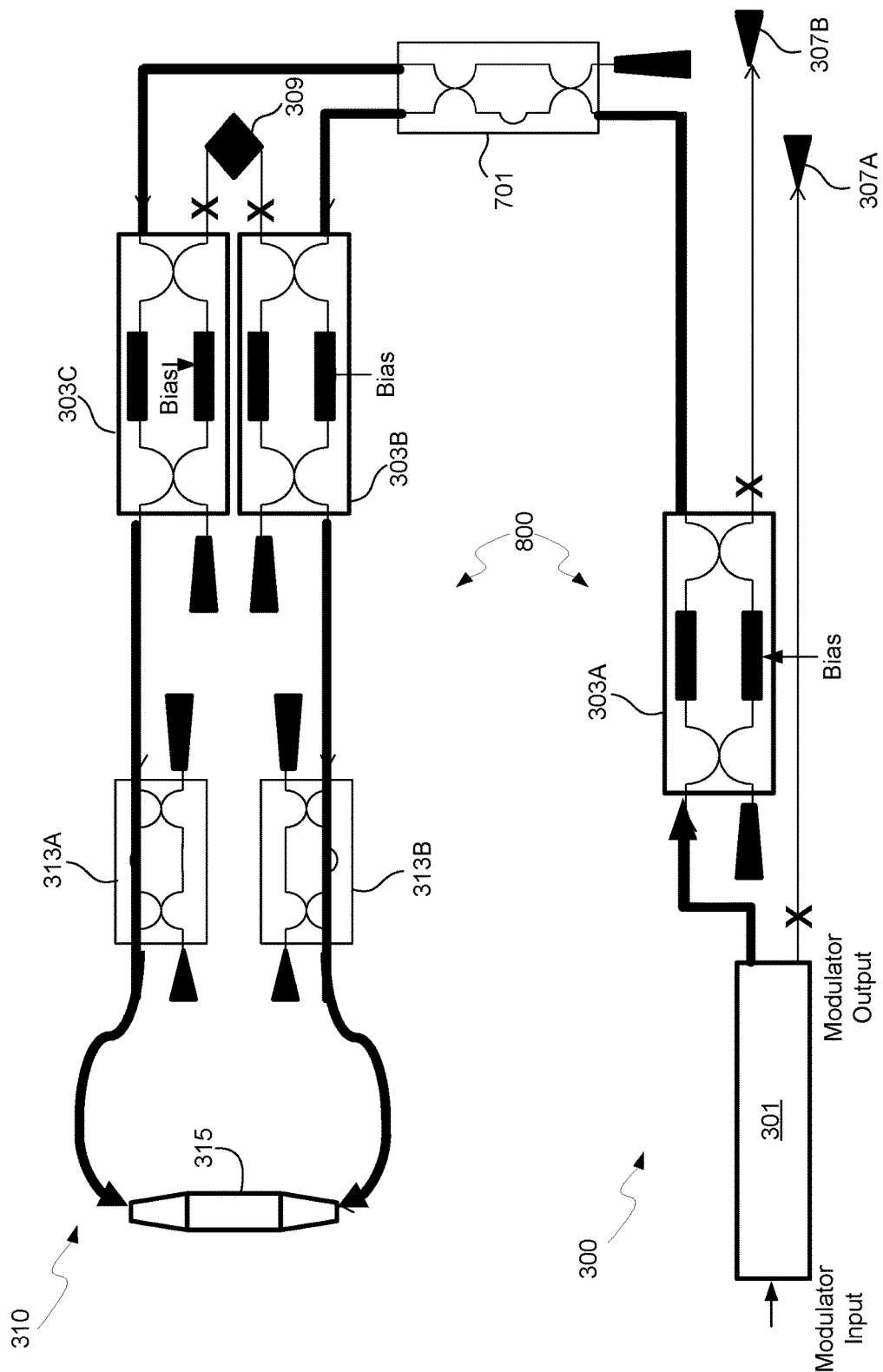
FIG. 8 illustrates another example integrated transceiver in self-test mode, in accordance with an example embodiment of the disclosure.

FIG. 8 illustrates another example integrated transceiver in self-test mode, in accordance with an example embodiment of the disclosure. Referring to FIG. 8, there is shown transceiver 800 with Rx path 300 and Tx path 310 of FIG. 7, but with each of the Normally OFF optical switches 303A-303C configured in an ON state, such that the bar output of the modulator 301 is coupled to the Rx path 310 via the directional coupler 701, (e.g., a splitter) which may comprise a 50% tap directional coupler, for example, between the Rx path 300 and the Rx path 310. The directional coupler 701, or optical splitter, couples 50% of the optical signal from the Tx path 300 to each optical switch 303B and 303C in the Rx path 310, which are also in an ON state so that the received signals are coupled to the photodetector 315, instead of a signal from the PSGC 309.

This represents a "test" mode of the transceiver 700 comprising the Tx path 300 and Rx path 310, where the Tx path 300 provides a signal to test both the Tx path 300 and the Rx path 310 without requiring a physical optical connection to the photonic circuit, as the output signal is an electrical signal from the photodetector 315. In this mode both sides of the Rx path get tested.

To enter internal loopback mode, current in the 3 active PINPMs in the optical switches 303A-303C starts at ~1 mA and then is actively set to maximize Rx photodetector 315 photo-current, with the initial guess as the lower bound. Independent setting across the three phase modulators in the optical switches 303A-303C is likely not required as the same current source can be mirrored for all three. Using this switching approach, PIN phase modulators in the optical switches 303A-303C may be actively set to the correct current even with an external optical signal connected to the PSGC 309. If connected, the external signal may be extinguished by >10 dB at the start of the switching cycle.

For easiest integration into a tester, a large area detector may be designed into a fixture that has the same outer dimensions as the dust-cap used on the QSFP modules comprising the transceiver 800 so that it can be readily inserted into a multiple fiber push-on/pull-off (MPO) adaptor. This structure is particularly useful in quality assurance and low-profile coupler/fiber tests where coarse effects are important, such as detecting broken fibers. In addition, the full Rx path as well as the accuracy of a low profile coupler attached to the Rx path and bending loss, can be characterized with reasonable accuracy, which enables a high volume production test.

Figure 9:
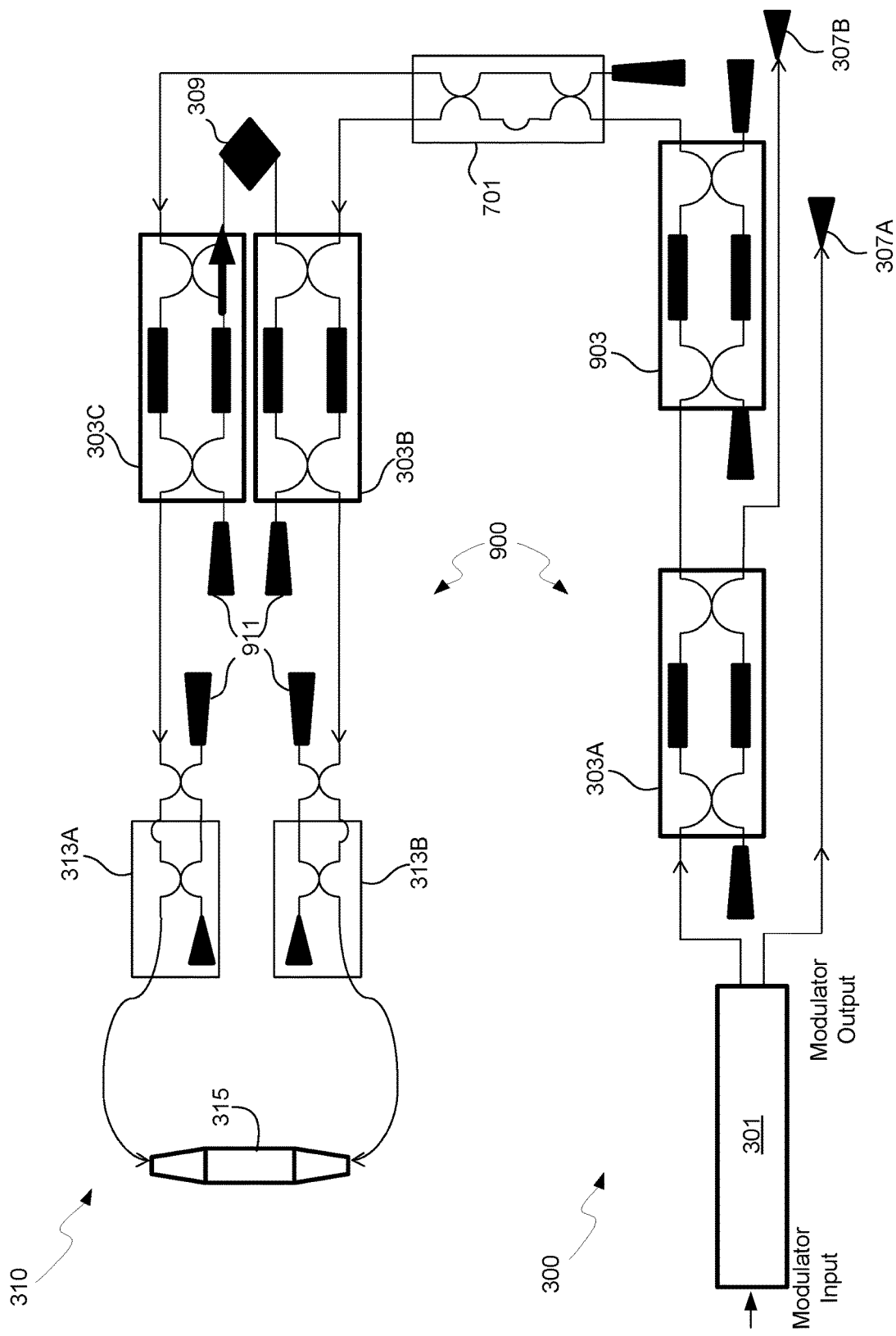
FIG. 9 illustrates another example integrated transceiver with built-in self-test capabilities and increased crosstalk isolation, in accordance with an example embodiment of the disclosure.

FIG. 9 illustrates another example integrated transceiver with built-in self-test capabilities and increased crosstalk isolation, in accordance with an example embodiment of the disclosure. Referring to FIG. 9, there is shown Tx and Rx paths of FIGS. 7 and 8 but with an added Normally OFF optical switch 903 in the Tx path 300, which results in increased crosstalk extinction ration, with an added 15-20 dB extinction ratio, for example.

As with the example of FIG. 7, the Tx optical switches 303A and 903 may be configured in an ON state, such that the bar output of the modulator 301 is coupled to the Rx path 310 via the directional coupler (e.g., splitter) 701, comprising a 50% tap directional coupler, between the Tx and Rx paths. The directional coupler 701 couples 50% of the signal to each optical switch 303B and 303C in the Rx path 310, which may also be configured in an ON state so that the received signals are coupled to the photodetector 315, instead of receiving a signal from the PSGC 309.

This example again represents a "test" mode of the transceiver 900 comprising the Tx path 300 and Rx path 310, where the Tx path 300 provides a signal to test both the Tx path 300 and the Rx path 310 without requiring a physical optical connection to the photonic circuit, as the output signal is an electrical signal from the photodetector 315. While the added optical switch 903 is shown in the embodiments with the directional coupler 701, it is also possible to use this added switch in the other embodiments, such as those shown in FIGS. 3-6.

In an example embodiment, a method and system are disclosed for connectionless integrated optical receiver and transmitter test. In this regard, aspects of the disclosure may comprise in an optoelectronic transceiver comprising a transmit (Tx) path and a receive (Rx) path, with each path comprising one or more optical switches: generating a first modulated optical signal utilizing a modulator in the Tx path, coupling the first modulated optical signal to a first optical switch in the Rx path via a second optical switch in the Tx path when the optoelectronic transceiver is configured in a self-test mode, receiving a second modulated optical signal via a grating coupler in the Rx path when the optoelectronics transceiver is configured in an operational mode, and communicating the second modulated optical signal to a photodetector in the Rx path via the first optical switch.

The first modulated optical signal may be communicated to a grating coupler in the Tx path via the second optical switch. The one or more optical switches in the Rx and Tx paths may be normally off optical switches. The one or more optical switches in the Rx and Tx paths may include first and second directional couplers and at least one phase modulator. The one or more optical switches may be configured in different states by applying bias to the at least one phase modulator. The first modulated optical signal may be communicated from the second optical switch in the Tx path to the first optical switch in the Rx path via a directional coupler between the Tx path and the Rx path.

The first modulated optical signal may be communicated from the second optical switch in the Tx path to the first optical switch in the Rx path via a third optical switch in the Tx path. The first modulated signal may be communicated to the grating coupler in the Rx path via the first optical switch and a fourth optical switch in the Rx path when the optoelectronic transceiver is configured in the self-test mode. The first optical switch may be coupled to a first input of the photodetector and the fourth optical switch may be coupled to a second input of the photodetector. The optoelectronic transceiver may be on a semiconductor die.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A method for communication, the method comprising:
   in an optoelectronic transceiver comprising a transmit (Tx) path and a receive (Rx) path, each path comprising one or more optical switches:
   generating a first modulated optical signal utilizing a modulator in the Tx path;
   coupling the first modulated optical signal to a photodetector in the Rx path via a first optical switch in the Rx path and a second optical switch in the Tx path when the optoelectronic transceiver is configured in a first self-test mode;
   communicating the first modulated signal to a grating coupler in the Rx path via the second optical switch in the Tx path, the first optical switch in the Rx path, and a third optical switch in the Rx path when the optoelectronic transceiver is configured in a second self-test mode; and
   communicating the first modulated signal to a grating coupler in the Tx path when the optoelectronics transceiver is configured in an operational mode.

2. The method according to claim 1, comprising communicating the first modulated optical signal to the grating coupler in the Tx path via the second optical switch.

3. The method according to claim 1, wherein the one or more optical switches in the Rx and Tx paths comprise normally off optical switches.

4. The method according to claim 1, wherein the one or more optical switches in the Rx and Tx paths comprise first and second directional couplers and at least one phase modulator.

5. The method according to claim 4, wherein the one or more optical switches are configured in different states by applying bias to the at least one phase modulator.

6. The method according to claim 1, comprising communicating the first modulated optical signal from the second optical switch in the Tx path to the first optical switch in the Rx path via a directional coupler between the Tx path and the Rx path.

7. The method according to claim 1, comprising communicating the first modulated optical signal from the second optical switch in the Tx path to the first optical switch in the Rx path via a fourth optical switch in the Tx path.

8. The method according to claim 1, wherein the first optical switch is coupled to a first input of the photodetector and the third optical switch is coupled to a second input of the photodetector.

9. The method according to claim 1, wherein the optoelectronic transceiver is on a semiconductor die.

10. A system for communication, the system comprising:
an optoelectronic transceiver comprising a transmit (Tx) path and a receive (Rx) path, each path comprising one or more optical switches, the optoelectronic transceiver being operable to:
generate a first modulated optical signal utilizing a modulator in the Tx path;
couple the first modulated optical signal to a photodetector in the Rx path via a first optical switch in the Rx path and a second optical switch in the Tx path when the optoelectronic transceiver is configured in a first self-test mode;
communicate the first modulated signal to a grating coupler in the Rx path via the second optical switch in the Tx path, the first optical switch in the Rx path, and a third optical switch in the Rx path when the optoelectronic transceiver is configured in a second self-test mode; and
communicate the first modulated signal to a grating coupler in the Tx path when the optoelectronics transceiver is configured in an operational mode.

11. The system according to claim 10, wherein the optoelectronic transceiver is operable to communicate the first modulated optical signal to a grating coupler in the Tx path via the second optical switch.

12. The system according to claim 10, wherein the one or more optical switches in the Rx and Tx paths comprise normally off optical switches.

13. The system according to claim 10, wherein the one or more optical switches in the Rx and Tx paths comprise first and second directional couplers and at least one phase modulator.

14. The system according to claim 13, wherein the one or more optical switches are configured in different states by applying bias to the at least one phase modulator.

15. The system according to claim 10, wherein the optoelectronic transceiver is operable to communicate the first modulated optical signal from the second optical switch in the Tx path to the first optical switch in the Rx path via a directional coupler between the Tx path and the Rx path.

16. The system according to claim 10, wherein the optoelectronic transceiver is operable to communicate the first modulated optical signal from the second optical switch in the Tx path to the first optical switch in the Rx path via a fourth optical switch in the Tx path.

17. The system according to claim 10, wherein the optoelectronic transceiver is on a silicon complementary metal oxide semiconductor (CMOS) die.

18. A system for communication, the system comprising:
an optoelectronic transceiver comprising a transmit (Tx) path and a receive (Rx) path, the Tx path comprising a first optical switch and the Rx path comprising second and third optical switches, the optoelectronic transceiver being operable to:
generate a first modulated optical signal utilizing a modulator in the Tx path;
couple the first modulated optical signal to a grating coupler in the Tx path via the first optical switch in the Tx path when the optoelectronic transceiver is configured in an operational mode; and
couple the first modulated optical signal to a grating coupler in the Rx path via the first, second, and third optical switches when the optoelectronic transceiver is configured in a self-test mode, wherein the grating coupler in the Rx path receives a modulated input signal when the optical transceiver is configured in the operational mode.

19. The system according to claim 18, wherein the first, second, and third optical switches in the Rx and Tx paths comprise normally off optical switches.

20. The system according to claim 18, wherein the first, second, and third optical switches in the Rx and Tx paths comprise first and second directional couplers and at least one phase modulator.

* * * * *